United States Patent Office 3,843,348
Patented Oct. 22, 1974

3,843,348
USE OF 6-(TRIFLUOROMETHYL)HYDROURACILS AS HERBICIDES
Albert William Lutz, Montgomery Township, Somerset County, and Richard William Feeny, Hightstown, N.J., assignors to American Cyanamid Company, Stamford, Conn.
No Drawing. Original application Mar. 17, 1970, Ser. No. 20,382, now Patent No. 3,669,770. Divided and this application Feb. 16, 1972, Ser. No. 226,959
Int. Cl. A01n 9/22
U.S. Cl. 71—92                  9 Claims

ABSTRACT OF THE DISCLOSURE

Herbicidal 3,5,6 - substituted - 6 - (trifluoromethyl)hydrouracils are provided having the formula:

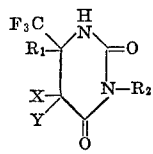

wherein:

X is halogen or lower alkyl;
Y is halogen;
$R_1$ is halogen, hydroxy, alkoxy or haloalkoxy; and
$R_2$ is hydrogen, alkyl, substituted alkyl, phenyl, cyclohexyl, cyclopentyl, substituted phenyl, or alkenyl.

CROSS-REFERENCE TO RELATED APPLICATION

This application is a divisional of application Ser. No. 20,382, filed on Mar. 17, 1970, now U.S. Pat. 3,669,970 (1972).

CROSS-REFERENCE TO RELATED APPLICATION

U.S. Pat. 3,322,526 relates to substituted hydrouracils of the formula:

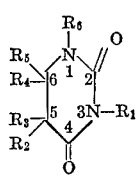

wherein groups $R_1$–$R_6$ are broadly defined. This patent also suggests that such compounds exhibit herbicidal activity and proposes four methods for the preparation of compounds of the above formula. However, it should be noted that the patentee does not contemplate the 6-halo, 6 - hydroxy, 6-alkoxy, or 6-haloalkoxy-6-(trifluoromethyl)hydrouracils of the present invention or a method for their manufacture.

He does suggest four methods for the preparation of his dihydrouracils. These include catalytic hydrogenation of a uracil of the formula:

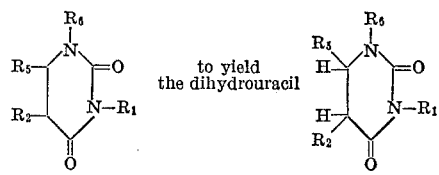

wherein $R_5$ is stated to be hydrogen, alkyl or alkoxy. Since this reaction adds hydrogen across the double bond, it does not lend itself to preparation of compounds of the present invention.

The second method of the patentee suggests cyclization of a substituted $\beta$-amino propionate with an isocyanate. The reaction is illustrated as follows:

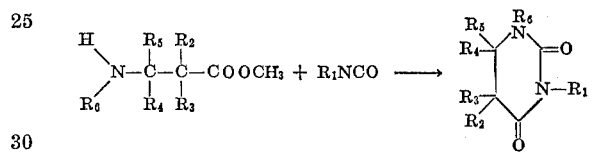

If this reaction was to be employed for the preparation of the compounds of the present invention, $R_5$ in the $\beta$-amino propionate would have to represent trifluoromethyl and $R_4$ would have to be halo, hydroxy, alkoxy or haloalkoxy. To the best of applicants knowledge these compounds have not been disclosed in the literature and no method for their preparation has been suggested.

The third method proposed by the patentee involves the reaction of a substituted urea with an $\alpha$, $\beta$-unsaturated acid as illustrated below:

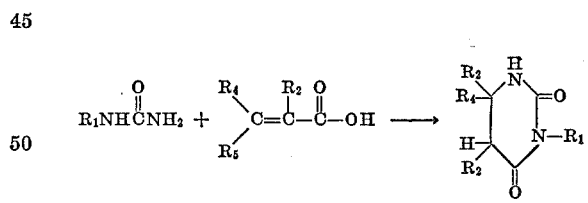

Again, the prior art appears to be devoid of $\alpha,\beta$-unsaturated acids of the above formula in which $R_5$ is trifluoromethyl, $R_4$ is halo, hydroxy, alkoxy or haloalkoxy and $R_2$ is halogen or alkyl. It also appears to be devoid of methods for making such compounds.

The fourth and final method described by the patentee for preparing his dihydrouracils involves exchange of certain functional groups without disturbing the dihydrouracil nucleus. The reaction is illustrated as follows:

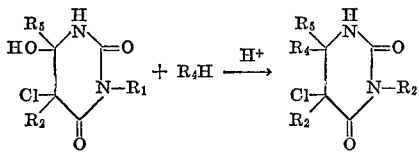

This final method, like those previously described, also fails to describe or anticipate the present invention, for heretofore the intermedaite compounds necessary to prepare the patentee's starting materials, i.e. 6-(trifluoromethyl)-uracils of the formula:

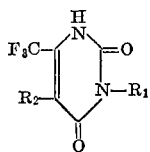

wherein $R_2$ is hydrogen, lower alkyl or halogen and $R_1$ is alkyl, alkenyl, phenyl, substituted phenyl, substituted alkyl, cyclohexy or cyclopentyl, have not been available or disclosed in the art. A complete description of these compounds and their preparation is provided in copending applications Ser. Nos. 737,288, filed June 17, 1968, now U.S. Pat. 3,580,913 and 737,308, filed June 17, 1968.

Summary.—This invention relates to novel 3,5,6-substituted-6-(trifluoromethyl)hydrouracils and a method for using said compounds. More particularly, this invention relates to hydrouracils which are effective herbicides and have the formula:

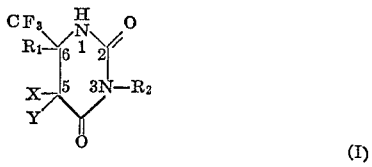

(I)

wherein:

X is selected from the group consisting of halogen and lower alkyl;

Y is halogen;

$R_1$ is selected from the group consisting of hydroxy, alkoxy, halogen, and haloalkoxy; and $R_2$ is selected from the group consisting of hydrogen, alkyl, alkenyl, substituted alkyl, phenyl, cyclohexyl, cyclopentyl, and substituted phenyl.

The compounds of this invention may also exhibit tautomeric forms as shown by way of example below:

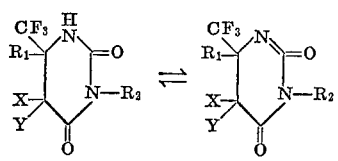

Such tautomeric structures are included with the scope of the invention as are the water soluble salts, particularly the sodium, potassium, and ammonium salts, of the compounds and tautomers.

The various groupings referred to hereinabove may be more particularly identified as follows:

The term "halogen" means fluorine, chlorine, bromine or iodine.

The term "alkyl" means a monovalent radical derived from a straight or branched chain aliphatic hydrocarbon be removal of one hydrogen atom and having 1 to 6 carbon atoms. Illustrative members include methyl, ethyl, n-propyl, isopropyl, n-butyl, isobutyl, sec-butyl, t-butyl, pentyl, and hexyl.

The term "lower alkyl" has the same meaning as "alkyl" but contains only from 1 to 4 carbon atoms.

The term "alkenyl" means unsaturated straight and banched hydrocarbon monovalent radicals containing from 2 to 6 carbon atoms. Illustrative members are allyl, 2-butenyl and 2-methylallyl.

The term "alkoxy" means a monovalent $R_3O$-radical where the $R_3$ group is an alkyl of from 1 to 6 carbon atoms; illustrative members are methoxy, ethoxy, propoxy, butoxy, pentoxy, and hexoxy.

The term "haloalkoxy" means an alkoxy radical containing either 1 to 2 halogen substituents and where there are 2 substituents they may be the same or different; illustrative members are 2-chloroethoxy, 3-bromopropoxy, dichloromethoxy, and 2,3-dibromopropoxy.

The term "substituted alkyl" means an alkyl radical as defined above wherein 1 or 2 hydrogens are replaced by a substituent selected from the group consisting of halogen, hydroxy, and lower alkoxy (i.e. an alkoxy group having from 1 to 4 carbon atoms). Where there are two substituents they may be identical or dissimilar; illustrative members are 2-methoxyethyl, 3-methoxypropyl, 2-bromopropyl, 4-chlorobutyl, 2-hydroxyethyl, and 4-hydroxybutyl.

The term "substituted phenyl" means a phenyl radical in which 1 or 2 of the hydrogen atoms are replaced with a substituent selected from the group consisting of nitro, halogen, lower alkoxy, haloalkoxy and trifluoromethyl. Where there are two substituents they may be identical or dissimilar; illustrative members are 2-nitrophenyl, 3,4-dichlorophenyl, 2,4-dichlorophenyl, m-trifluoromethylphenyl, 2-methoxyphenyl, and 4-dichloromethoxyphenyl.

DESCRIPTION OF THE PREFERRED EMBODIMENTS

Compounds

The following compounds are illustrative of the compounds of this invention (numbered in accordance with formula I):

5,5-dichloro-6-hydroxy-3-isopropyl-6-(trifluoromethyl)hydrouracil;
5,5-dichloro-3-isopropyl-6-methoxy-6-(trifluoromethyl)hydrouracil;
5,5-dichloro-6-ethoxy-3-isopropyl-6-(trifluoromethyl)hydrouracil;
3-sec-butyl-5,5-dichloro-6-methoxy-6-(trifluoromethyl)hydrouracil;
5,5-dichloro-3-isopropyl-6-propoxy-6-(trifluoromethyl)hydrouracil;
5,5-dibromo-6-hydroxy-3-isopropyl-6-(trifluoromethyl)hydrouracil;
5,5-dichloro-6-methoxy-3-phenyl-6-(trifluoromethyl)hydrouracil;
5-bromo-5-chloro-3-isopropyl-6-methoxy-6-(trifluoromethyl)hydrouracil;
5-bromo-5-chloro-6-hydroxy-3-isopropyl-6-(trifluoromethyl)hydrouracil;
5,5-dichloro-6-methoxy-3-methyl-6-(trifluoromethyl)hydrouracil;
5,5,6-trichloro-3-isopropyl-6-(trifluoromethyl)hydrouracil;
5-chloro-6-methoxy-3-methyl-5-methyl-6-(trifluoromethyl)hydrouracil;

5-chloro-6-ethoxy-3-methyl-5-ethyl-6-(trifluoromethyl)hydrouracil;
5-bromo-6-methoxy-3-ethyl-5-ethyl-6-(trifluoromethyl)hydrouracil;
5-bromo-6-hydroxy-3-isopropyl-5-isopropyl-6-(trifluoromethyl)hydrouracil;
5,5-dichloro-6-(2-chloroethoxy)-3-ethoxy-6-(trifluoromethyl)hydrouracil;
5,5-dibromo-6-(3-bromopropoxy)-3-propoxy-6-(trifluoromethyl)hydrouracil;
5,5-dichloro-6-(dichloromethoxy)-3-methoxy-6-(trifluoromethyl)hydrouracil;
5,5-dibromo-6-(2,3-dibromopropoxy)-3-propoxy-6-(trifluoromethyl)hydrouracil;
5,5-dichloro-6-ethoxy-3-(p-nitrophenyl)-6-(trifluoromethyl)hydrouracil;
5,5-diiodo-6-methoxy-3-(m-methoxyphenyl)-6-(trifluoromethyl)hydrouracil;
5,5-dichloro-6-propoxy-3-(p-trifluoromethylphenyl)-6-(trifluoromethyl)hydrouracil;
5-bromo-5-chloro-6-methoxy-3-(2-chloroethoxyphenyl)-6-(trifluoromethyl)hydrouracil;
5,5-dichloro-6-methoxy-3-allyl-6-(trifluoromethyl)hydrouracil;
5,5-dichloro-6-ethoxy-3-n-hexyl-6-(trifluoromethyl)hydrouracil;
5,5-dichloro-3-n-hexyl-6-n-propoxy-6-(trifluoromethyl)hydrouracil;
5,5-dichloro-3-n-hexyl-6-isopropoxy-6-(trifluoromethyl)hydrouracil;
6-butoxy-5,5-dichloro-3-n-hexyl-6-(trifluoromethyl)hydrouracil;
3-cyclohexyl-5,5-dichloro-6-ethoxy-6-(trifluoromethyl)hydrouracil;
3-cyclopentyl-5,5-dibromo-6-methoxy-6-(trifluoromethyl)hydrouracil;
3-(2-methylallyl)-5,5-dichloro-6-ethoxy-6-(trifluoromethyl)hydrouracil;
3-(p-chlorophenyl)-5,5-dichloro-6-methoxy-6-(trifluoromethyl)hydrouracil;
3-(2-chlorobutyl)-5,5-dichloro-6-propoxy-6-(trifluoromethyl)hydrouracil;
3-(p-methoxyphenyl)-5,5-dichloro-6-methoxy-6-(trifluoromethylhydrouracil;
3-sec-butyl-5,5-dichloro-6-ethoxy-6-(trifluoromethyl)hydrouracil;
3-sec-butyl-5,5-diiodo-6-n-propoxy-6-(trifluoromethyl)hydrouracil;
3-n-butyl-5,5-dichloro-6-(butoxy-1)-6-(trifluoromethyl)hydrouracil;
3-sec-butyl-5,5-dichloro-6-(butoxy-2)-6-(trifluoromethyl)hydrouracil;
3-sec-butyl-5,5-dichloro-6-(pentoxy-1)-6-(trifluoromethyl)hydrouracil;
3-n-butyl-5,5-dichloro-6-(pentoxy-2)-6-(trifluoromethyl)hydrouracil;
3-sec-butyl-5,5-dichloro-6-isopropoxy-6-(trifluoromethyl)hydrouracil;
5-fluoro-5-chloro-6-methoxy-3-n-propyl-6-(trifluoromethyl)hydrouracil;
5-iodo-5-chloro-6-hydroxy-3-isopropyl-6-(trifluoromethyl)hydrouracil;
5,5-difluoro-3-ethyl-6-ethoxy-6-(trifluoromethyl)hydrouracil;
5,5-diiodo-3-isopropyl-6-methoxy-6-(trifluoromethyl)hydrouracil;
5,5-dibromo-3-isopropyl-6-methoxy-6-(trifluoromethyl)hydrouracil;
5,5-dibromo-5-n-hexyl-6-methoxy-6-(trifluoromethyl)hydrouracil;
5,5-dibromo-6-ethoxy-3-n-hexyl-6-(trifluoromethyl)hydrouracil;
5,5-dibromo-3-n-hexyl-6-n-propoxy-6-(trifluoromethyl)hydrouracil;
5,5-dibromo-3-n-hexyl-6-isopropoxy-6-(trifluoromethyl)hydrouracil, and
5,5-dibromo-6-butoxy-3-n-hexyl-6-(trifluoromethyl)uracil.

5,5,6-tribromo-6-(trifluoromethyl)hydrouracil
5,5-diiodo-6-ethoxy-6-(trifluoromethyl)hydrouracil
5,5-dibromo-6-hydroxy-6-(trifluoromethyl)hydrouracil
5,5-dichloro-6-(3-bromopropoxy)-6-(trifluoromethyl)hydrouracil
5,6-dibromo-5-i-butyl-6-(trifluoromethyl)hydrouracil
5,6-diiodo-5-methyl-6-(trifluoromethyl)hydrouracil
5-bromo-5-methyl-6-hydroxy-6-(trifluoromethyl)hydrouracil
5-bromo-5-methyl-6-methoxy-6-(trifluoromethyl)hydrouracil Process The 3,5,6 - substituted-6-(trifluoromethyl)hydrouracils of this invention are prepared by reacting a 3-substituted or a 3,5-substituted-6-trifluoromethyl uracil of the formula:

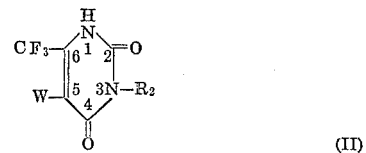

(II)

wherein, W is hydrogen, halogen or lower alkyl and $R_2$ is as described above, with (A) a halogen in the presence of water, (B) a halogen in the presence of an alcohol having from 1 to 6 carbon atoms such as methanol, ethanol, n-propanol, isopropanol, butanol, 2-butanol, pentanol, or the like, (C) a halogen in the presence of a halogenated alcohol such as 2-chloroethanol, 1-chloro-2-propanol, 1,3-dichloro-2-propanol, 3-bromo-1-butanol, 4-chloro-1-butanol, 2-bromoethanol or the like, or (D) a halogen in the presence of water followed by treatment of the thus formed reaction product with a thionylhalide such as thionylchloride, thionylbromide, or thionylfluoride.

Reactions (A), (B), and (C) are graphically illustrated below:

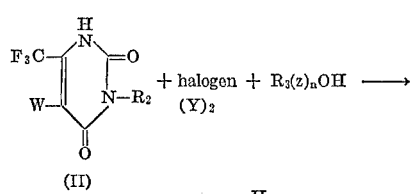

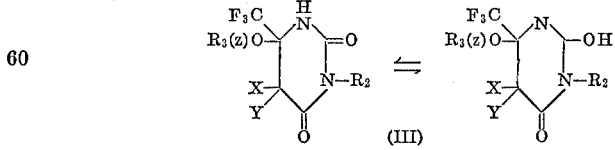

wherein:

W is hydrogen, halogen or lower alkyl;
X is halogen or lower alkyl;
Y is halogen;
z is halogen;
n is an integer of from 0 to 2;
$R_3$ is hydrogen or alkyl of 1 to 6 carbon atoms; and
$R_2$ is hydrogen, alkyl, substituted alkyl, phenyl, cyclohexyl, cyclopentyl, alkenyl, or substituted phenyl.

Reaction (D) employs the reaction product of (A) and involves contacting said product with a thionylhalide to yield the 3-substituted-6-halo-6-(trifluoromethyl)hydrouracil (V). This reaction is graphically illustrated below:

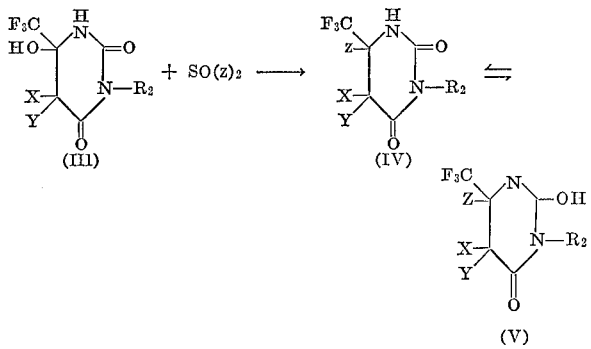

where z is halogen.

We have found that these reactions (A through D) are generally exothermic and that the temperature at which each of said reactions is carried out is critical. While temperatures between about 25° and 60° C. generally give optimum efficiency, such reactions may be carried out over a wider temperature range as, for example, between about 15° C. and 75° C. In any event, the reaction temperature must be maintained sufficiently high to permit hypohalous acid or organic hypohalites to add across the double bond of the uracil but below that temperature at which hypohalite is liberated from the hydrouracil formed. In practice said reactions will generally be conducted at atmospheric pressure, however, subatmospheric and superatmospheric pressures may be used if desired. It has also been determined that an inert solvent such as benzene, chloroform or carbon disulfide may be used in reactions (A–D) without adversely effecting product yield. This practice, however, is generally most advantageously employed where the reaction mixture tends to be viscous, i.e. in reactions utilizing the higher alcohols or the halogenated higher alcohols.

As will become apparent from the examples set forth below, reaction (A) yields formula (I) hydrouracils wherein $R_1$ is hydroxy; (B) yields similar compounds in which $R_1$ is alkoxy; (C) yields like compounds where $R_1$ is haloalkoxy and (D) provides the formula (I) compounds in which $R_1$ is fluorine, chlorine or bromine. Moreover, from the appended examples it will also become apparent that in reactions (A), (B) and (C) when W in the formula (II) compound represents hydrogen, X and Y in the formula (III) hydrouracil are the same and represent the halogen employed in the reaction. However, when W represents a halogen which differs from the halogen $(Y)_2$ added to the reaction mixture, a hydrouracil with mixed halogens at the 5 position is formed, X representing the halogen W and Y the halogen added. Similarly, where W is lower alkyl, such as methyl, ethyl, propyl, isopropyl, butyl or sec butyl, the hydrouracil with a lower alkyl and a halogen at the 5 position is formed.

Reactants

As described in copending applications Ser. Nos. 737,308, filed June 17, 1968 and 737,288, filed June 17, 1968, now U.S. Pat. No. 3,580,913, the 3,5-substituted-6-(trifluoromethyl)uracils (II) employed as starting materials in the manufacture of the compounds of the present invention wherein $R_2$ is not hydrogen are prepared by an ester of a β-amino-α,β-unsaturated acid with an isocyanate in the presence of an inert solvent and an alkali metal hydride or alkali metal lower alkoxide. Graphically this reaction may be illustrated as follows:

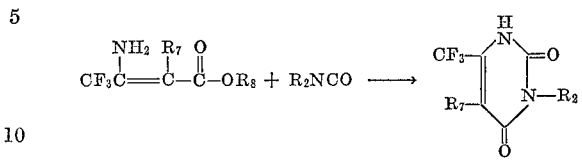

wherein $R_7$ is halogen, lower alkyl or hydrogen, $R_8$ is lower alkyl and $R_2$ is alkyl, substituted alkyl, phenyl, cyclohexyl, cyclopentyl, substituted phenyl or alkenyl. In the case where the $R_2$ substituent of the compounds of this invention is hydrogen, the required starting materials (II) are either available to those skilled in the art or else can be prepared from available materials in accordance with procedures known to those skilled in the art such as, for example, that reported by Kaiser and Burger in J. Org. Chem. 24, 113 (1959).

Solvents particularly adapted to use in these reactions are the 1 to 8 carbon alcohols such as methanol, ethanol, propanol, octanol, t-butanol, and the like; the glycol ethers such as diethylene glycol dimethylether, ethylene glycol dimethylether, ethylene glycol diethyl ether and the like; and dipolar aprotic solvents such as dimethylsulfoxide, dimethylformamide, methyl isobutyl ketone, N,N-dimethylacetamide, and the like.

Among the bases which are suitable for use in these reactions are potassium-t-butoxide, sodium methoxide, sodium hydride, potassium hydroxide, pentamethylguanidine, potassium hydride and sodium metal. The reactions may be carried out over a wide temperature range of from about 15° C. to 100° C., with a preferred range of about 25° C. to 50° C. It has also been found that about 1.0 moles to 1.5 moles of base per mole of reactant provide optimum product yields.

Utility

The inventive compounds are potent pre and post emergence herbicides as amply shown by the illustrative data of Examples 1 through 4 hereinbelow.

The herbicidal compositions of the present invention may be prepared as solutions of water soluble salts, as emulsifiable concentrates, dusts, dust concentrates and wettable powders which lend themselves to application with conventional spraying and dusting equipment.

Representative formulations which may be prepared are provided below (percentages are by weight):

Aqueous solution

|  | Percent |
|---|---|
| 5,5-dichloro - 3 - isopropyl-6-methoxy-6-(trifluoromethyl)hydrouracil | 22.5 |
| Triethylamine | 8.0 |
| Water (a lower alcohol such as methanol, ethanol or the like may also be used as cosolvent) | q.s. 100 |

Emulsifiable concentrate

|  | Percent |
|---|---|
| 5,5-dichloro - 3 - isopropyl - 6 - methoxy-6-(trifluoromethyl)hydrouracil | 25 |
| Nonionic-anionic emulsifier (mol 77L [by Wm. Cooper and Nephers]) | 10 |
| Methylisobutylketone | 65 |

(Dispersed in water for application).

Wettable powder

| | Percent |
|---|---|
| 5,5-dichloro - 6 - ethoxy - 3 - isopropyl-6-(trifluoromethyl)hydrouracil | 50 |
| Wetting agent—oleic acid ester of sodium isothionate | 3.0 |
| Dispersant—sodium salt of polymeric carboxylic acid | 3.0 |
| Attaclay | 44.0 |
| 5,5-dibromo-6-hydroxy - 3 - isopropyl-6-(trifluoromethyl)hydrouracil | 80 |
| Oleic acid ester of sodium isothionate (Igepon AP–78) | 1 |
| Sodium salt of polymeric carboxylic acid (Tamol 731) | 3 |
| Kaolinite | 16 |

In practice the compositions of the invention may be used to control a wide variety of monocotyledonous and dicotyledonous plants. They may be used for both post-emergence and pre-emergence control of plants by application to plant foliage or to soil containing seeds or other propagules of plants and find particular utility as selective post-emergence and pre-emergence herbicides. As selective post-emergence herbicides they are especially useful for controlling broadleaf weeds and grasses in the presence of crops such as corn, cotton and sorghum. As selective pre-emergence herbicides they are especially useful for controlling weeds and grasses in the presence of crops such as corn, sorghum, soybeans, lima beans, cotton, peas, string beans, watermelons, cucumbers, squash and pumpkin.

The following examples are provided to further illustrate the invention.

EXAMPLE 1

Postemergence herbicidal activity

The postemergence herbicidal activity of the compounds of the present invention is demonstrated by the following tests wherein a variety of monocotyledonous and dicotyledonous plants are treated with test compounds dispersed in aqueous-acetone mixtures. In the tests seedling plants are grown in jiffy flats for about two weeks. The test compounds are dispersed in 50/50 acetone/water mixtures in sufficient quantity to provide the equivalent of about 0.125 to 10 pounds per acre of active compound when applied to the plants through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated according to the Herbitoxicity Index provided below. The data obtained are reported in Table I.

Herbitoxicity Index

9=100% reduction in stand.
9−=1 or 2 stunted plants remaining.
8=85-100% reduction in stand.
7=70-85% reduction in stand.
6=60-70% reduction in stand.
5=50-60% reduction in stand.
4=40-50% reduction in stand.
3=30-40% reduction in stand.
2=20-30% reduction in stand.
1=10-20% reduction in stand.
0=No apparent effect.

$s$=Severe injury.
$m$=Moderate injury.
$t$=Trace to slight injury.
−=No test.
$c$=Chlorosis.
$g$=Growth retarded.
$a$=Abnormal growth.
$r$=Regrowth.

Plant Abbreviations

AW=Alligator weed.
BW=Bindweed.
CT=Canada thistle.
JG=Johnson grass.
NS=Nutsedge.
QG=Quackgrass.
KO=Kochia.
LA=Lamb's quarters.
Mu=Mustard.
PI=Pigweed.
BA=Barnyard grass.
CR=Crabgrass.
GRF=Green foxtail.
WO=Wild oats.
MI=Millet.
PF=Parrots feathers.
COR=Corn.
COT=Cotton.
SOY=Soybean.
SB=Sugar beets.
TO=Tomato.
WH=Wheat.
RA=Radish.
LB=Lima beans.
SG=Sorghum.

TABLE—Continued

| Compound | Treatment lb./acre | Perennial weeds | | | | | | | Annual weeds | | | | | | | | | | Crops | | | | | |
|---|---|---|---|---|---|---|---|---|---|---|---|---|---|---|---|---|---|---|---|---|---|---|---|---|
| | | AW | BW | CT | JG | NS | OG | KO | LA | MU | PI | BA | CR | GRF | WO | PF | COR | COT | SOY | SB | TO | WH | RA |
| F₃C-C(OCH₃)(Cl)-C(Cl)-C(=O)-N(CH₃)-CHCH₂CH₃; H-N-C=O | 4 | 9 | 9 | 9 | 0 | 0 | 9r | 9 | 9 | 9 | 9 | 5 | 5 | 9 | 9 | — | 9 | 9 | 7 | 9 | — | — | — |
| | 1 | 9 | 9 | 9 | 0 | 0 | 9r | 9 | 9 | 9 | 9 | t | t | 9 | 9 | — | m | 9 | 3 | 9 | — | — | — |
| n-C₃H₇O-C-C(Cl)-C(Cl)-C(=O)-N-CH(CH₃)₂; H-N-C=O | 4 | 9 | 9 | 9 | 9 | 9 | 9r | 9 | 9 | 9 | 9 | 9 | 9 | 9 | 9 | — | 9 | 9 | 9 | 9 | — | — | — |
| | 1 | t | 9 | 9 | 6 | t | t | 9 | 9 | 9 | 9 | t | t | 7₀ | 9 | — | 9 | 9 | 7 | 9 | — | — | — |
| | ½ | — | — | — | — | — | — | 9 | 9 | 9 | 5 | t | t | t | 7 | — | 7 | 6 | 3 | 7 | — | — | — |
| F₃C-C(OH)-C(Br)-C(Br)-C(=O)-N-CH(CH₃)₂ | 4 | tc | 9 | 9 | t | 0 | 0 | t | 9 | 9 | 9 | t | 9 | 9 | 9 | — | t | t | t | 5 | — | — | — |
| | 1 | 0 | 9 | 9 | 0 | 0 | 0 | t | 6 | — | — | 0 | t | t | t | — | t | t | 0 | 0 | — | — | — |
| F₃C-C(OCH₃)-C(Cl)-C(Cl)-C(=O)-N-CH(CH₃)₂ | 4 | 9 | 9 | 9 | 7 | t | 9r | 9 | 9 | 9 | 9 | 9 | 8 | 9 | 9 | — | 9 | 9 | 9 | 9 | — | — | — |
| | 1 | 0 | 9 | 9 | 0 | 0 | 7 | 9 | 9 | 9 | 9 | t | t | t | 6 | — | 9 | 9 | 9 | 9 | — | — | — |
| | ½ | 9 | 9 | 9 | 0 | 0 | 6 | 8 | 9 | 9 | — | t | t | 7 | — | — | 9 | t | t | 6 | — | — | — |
| | ½ | — | — | — | — | — | — | — | — | — | — | t | t | 6 | 6 | t | t | t | t | 5 | — | — | — |
| F₃C-C(OH)-C(Cl)(Br)-C(=O)-N-CH(CH₃)₂ | 10 | — | — | — | — | — | — | — | 8 | 9 | t | t | sg | — | 9 | t | — | — | — | — | 9 | 8 | t |
| F₃C-C(OCH₃)-C(Cl)(Cl)-C(=O)-N-C₆H₅ | 4 | — | — | — | — | — | — | 9 | 9 | 9 | 9 | t | t | 3 | 9 | — | 3 | 9 | sc | 9 | — | — | — |
| | 1 | — | — | — | — | — | — | 8 | 9 | 9 | 9 | t | t | t | 8 | — | 5 | 9 | sc | 9 | — | — | — |
| | ½ | — | — | — | — | — | — | 8 | 9 | 9 | 9 | t | 0 | 0 | — | — | 3 | 9 | m | 9 | — | — | — |

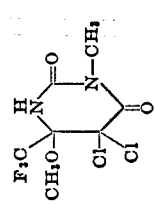
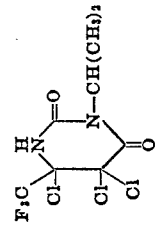
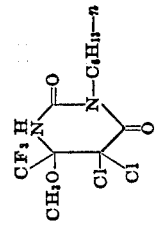
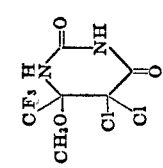
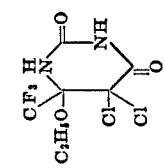
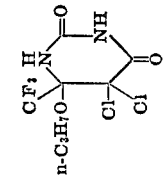

EXAMPLE 2

Selective pre-emergence herbicidal activity

The selective pre-emergence herbicidal activity of the compounds of the invention is exemplified by the following tests in which the seeds of a variety of monoocotyledonous and dicotyledonous plants are separately mixed with potting soil and planted on top of approximately one inch of potting soil in separate pint cups. After planting, the cups are sprayed with the selected aqueous-acetone solution containing test compound in sufficient quantity to provide the equivalent of about 0.25 to 25 pounds per acre of test compound per cup. The treated cups are then placed on greenhouse benches and cared for in accordance with greenhouse procedures. Three weeks after treatment, the tests are terminated and each cup is examined and rated according to the Herbitoxicity Index set forth in the previous example. The tabulated results of these tests establish the herbicidal proficiency of the test compounds and are reported in Table II below.

TABLE II

| Compound | Treatment (lb/acre) | KO | LA | MU | PI | BA | CR | GRF | WO | MI | COR | COT | SOY | SB | WH | RA | LB | SG |
|---|---|---|---|---|---|---|---|---|---|---|---|---|---|---|---|---|---|---|
| $F_3C$, $CH_-$, $Cl$, $Cl$, N-H, N-$CH(CH_3)_2$ | 16 | 0 | 9m | 9— | 9 | 0 | 0 | 3 | 7 | — | 0 | 0 | 0 | 3 | — | — | — | — |
| $F_3C$, $CH_3O$-, $Cl$, $Cl$, N-H, N-$CH(CH_3)_2$ | 4 | 9 | 9 | 9 | 9 | 9 | 9 | 9— | 9 | — | t | 9— | 9— | 9 | — | — | — | — |
| | 1 | 8 | 9 | 9 | 9 | 9 | 9 | 9— | 9 | — | 0 | 0 | 0 | 9 | — | — | — | — |
| | ½ | 0 | 9 | 9 | 9 | t | 8 | 5 | 3 | — | 0 | 0 | 0 | 3 | — | — | — | — |
| | ¼ | 3g | 9— | 9 | 8g | 3g | 3g | 3g | 8 | — | t | — | 0 | — | — | — | — | — |
| $F_3C$, $C_2H_5O$-, $Cl$, $Cl$, N-H, N-$CH(CH_3)_2$ | 4 | 9— | 9 | 9 | 9 | 9 | 9 | 9 | 9 | — | t | tg | 7o | 9 | — | — | — | — |
| | 1 | 3 | 9— | 9 | 9 | 5g | 8g | 8g | 9— | — | 0 | 0 | to | 9— | — | — | — | — |
| | ¼ | 0 | 9— | 9— | 9— | 0 | tg | 3g | t | — | 0 | 0 | 0 | 0 | — | — | — | — |
| $F_3C$, $CH_3O$-, $Cl$, $Cl$, N-H, N-$CHCH_2CH_3$ | 4 | 9 | 9— | 9 | 9 | 9 | 9— | 9 | 9 | — | t | — | tg | — | — | — | 9 | 3g |
| | ¼ | 9 | 9— | 9 | 8g | tg | 7g | 3g | t | — | t | — | 0 | — | — | — | 0 | 0 |
| $F_3C$, $n\text{-}C_3H_7O$-, $Cl$, $Cl$, N-H, N-$CH(CH_3)_2$ | 4 | 9 | 9 | 9 | 9 | 9— | 9 | 9 | 9 | — | t | — | tg | — | — | — | 0 | 7g |
| | ¼ | tg | 9— | 9 | 9 | tg | 7g | 3g | m | — | t | — | 0 | — | — | — | 0 | 0 |
| $F_3C$, $HO$-, $Br$, $Br$, N-H, N-$CH(CH_3)_2$ | 25 | — | — | 9 | — | — | — | — | — | 5g | — | — | — | — | 5o | ta | — | — |
| $F_3C$, $CH_3O$-, $Cl$, $Br$, N-H, N-$CH(CH_3)_2$ | 4 | 9 | 9 | 9 | 9 | 9 | 9 | 9 | 8 | — | t | — | 9 | — | — | — | t | 5g |
| | ¼ | 7g | 7g | 9— | 9 | t | 3 | 3g | 8 | — | t | — | 0 | — | — | — | 0 | 0 |
| $F_3C$, $HO$-, $Cl$, $Br$, N-H, N-$CH(CH_3)_2$ | 25 | — | — | 9 | — | — | — | — | — | 9— | — | — | — | — | tg | 0 | — | — |
| $F_3C$, $CH_3O$-, $Cl$, $Cl$, N-H, N-phenyl | 4 | 9 | 9 | 9 | 9 | 8g | tg | 0 | 9 | — | tg | t | s | 9 | — | — | — | — |
| | ½ | 9— | 9— | 9— | 9 | tg | 0 | 0 | 0 | — | 0 | 0 | t | 9— | — | — | — | — |

TABLE II—Continued

| Compound | Treatment (lb/acre) | Annual weeds | | | | | | | | | Crops | | | | | | | |
|---|---|---|---|---|---|---|---|---|---|---|---|---|---|---|---|---|---|---|
| | | KO | LA | MU | PI | BA | CR | GRF | WO | MI | COR | COT | SOY | SB | WH | RA | LB | SG |
| 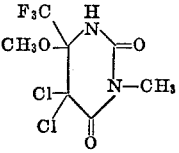 | 4<br>1 | 9<br>9— | 9—<br>8 | 9<br>9 | 9<br>3 | sg<br>0 | 9<br>9— | mg<br>mg | t<br>0 | —<br>— | sga<br>0 | 0<br>0 | sga<br>tc | 0<br>0 | —<br>— | —<br>— | —<br>— | —<br>— |
| 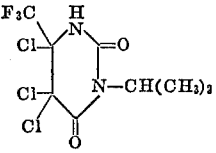 | 25 | — | — | 9 | — | — | — | — | — | 3a | — | — | — | — | mg | 0 | — | — |
| 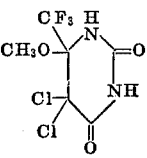 | 4<br>1<br>⅓ | 9<br>9<br>8g | 9<br>8g<br>3g | 9<br>9<br>3 | 9<br>9<br>0 | 9—<br>3<br>0 | 9<br>9<br>0 | 7<br>tg<br>H0 | 9<br>t<br>0 | —<br>—<br>— | 9<br>sg<br>0 | —<br>—<br>— | c<br>c<br>0 | —<br>—<br>— | —<br>—<br>— | —<br>—<br>— | —<br>—<br>— | —<br>—<br>— |
| 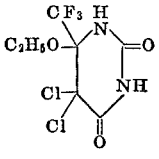 | 4<br>1<br>¼ | 9<br>9<br>9 | 9<br>7g<br>3 | 9<br>9<br>5 | 9<br>9<br>3 | 8<br>3<br>0 | 9<br>9<br>3 | 7g<br>tg<br>0 | 9<br>t<br>0 | —<br>—<br>— | 9<br>t<br>0 | —<br>—<br>— | sc<br>mc<br>0 | —<br>—<br>— | —<br>—<br>— | —<br>—<br>— | —<br>—<br>— | —<br>—<br>— |
| 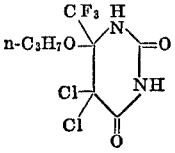 | 4<br>1<br>¼ | 9<br>9<br>9 | 9<br>8<br>3 | 9<br>9—<br>3 | 9<br>9—<br>3 | 9<br>3<br>0 | 9—<br>9—<br>5 | 9<br>9—<br>0 | 8<br>mg<br>0 | 8<br>m<br>0 | —<br>—<br>— | 9<br>s<br>t | —<br>—<br>— | sc<br>mc<br>0 | —<br>—<br>— | —<br>—<br>— | —<br>—<br>— | —<br>—<br>— |
| 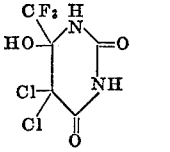 | 4 | 0 | 0 | 3 | 3 | 0 | 0 | 0 | 0 | — | 0 | — | 0 | — | — | — | — | — |

EXAMPLE 3

Selective pre-emergence herbicidal activity

Selective pre-emergence herbicidal activity of the compounds of the present invention is demonstrated in the following tests wherein test compounds are dissolved in 50/50 acetone/water solutions and applied in dilute aqueous solution to seeded plots with a standard spraying apparatus operated so as to deliver 57 gal./acre of test solution which provides the equivalent of 0.50, 1.0, 1.5, 2.0 or 3.0 lbs. of active ingredient/acre of seeded plot. The soil is prepared in the normal manner by plowing and harrowing. Seeds of the broadleaf weeds (i.e., pigweed, lambsquarters, smartweed, ragweed and jimpson weed) and grasses (i.e., foxtail and crabgrass) are broadcast over the plot and disked into the soil to assure heavy weed infestation. The plots 5 ft. wide and 20 ft. long, are then planted with corn, soybeans, limabeans, wheat and sorghum in rows approximately 10 inches apart. When plantings are complete, the plots are sprayed with aqueous solution of the test compounds using the sprayer to deliver the solutions essentially uniformly over the test plots. Untreated plots which have been similarly planted are employed as controls. At intervals of about twenty-four and forty-seven days after planting, the plots are examined and rated as a herbicidal activity according to the index set forth below. At both readings control plots adjacent to test plots are heavily infested with all species of the broadleaf weeds and grasses employed in the tests. Data obtained are reported in Table III.

TABLE III

| Compound | Rats, lb./acre | First rating 24 days | | | | | | | Second rating 47 days | | | | | | |
|---|---|---|---|---|---|---|---|---|---|---|---|---|---|---|---|
| | | Wheat 1 | Corn 2 | Soybeans 3 | Corn 4 | Sorghum 5 | AGW | ABW | Wheat 1 | Corn 2 | Soybeans 3 | Corn 4 | Sorghum 5 | AGW | ABW |
| CF₃ H / CH₃O / Cl / Cl / N=O / N-i-C₃H₇ / O | ½ | 2 | 0 | 0 | 0 | 0 | 7 | 8 | x | x | x | x | x | 7 | 8 |
| | 1 | 2 | 0 | 2 | 0 | 0 | 9 | 9 | x | x | x | x | x | 7 | 8 |
| | 2 | 4 | 0 | 0 | 0 | 2 | 8 | 10 | I | x | x | x | x | 8 | 9 |
| | 3 | 8 | 0 | 0 | 1 | 3 | 9 | 10 | I | x | x | x | x | 9 | 10 |
| CF₃ H / C₂H₅O / Cl / Cl / N=O / N-i-C₃H₇ / O | ½ | 3 | 0 | 0 | 0 | 4 | 7 | 8 | x | x | x | x | x | 7 | 9 |
| | 1 | 4 | 1 | 2 | 0 | 3 | 7 | 10 | x | x | x | x | x | 9 | 10 |
| | 2 | 6 | 0 | 2 | 0 | 1 | 8 | 10 | K | x | x | x | x | 9 | 10 |
| | 3 | 8 | 0 | 3 | 0 | 3 | 10 | 10 | I | x | x | x | x | 9 | 10 |
| CF₃ H / n-C₃H₇O / Cl / Cl / N=O / N-i-C₃H₇ / O | ½ | 4 | 0 | 3 | 0 | 1 | 6 | 8 | x | x | x | x | x | 8 | 8 |
| | 1 | 4 | 0 | 2 | 0 | 2 | 9 | 10 | x | x | x | x | x | 9 | 10 |
| | 2 | 3 | 0 | 3 | 0 | 2 | 8 | 10 | K | x | I | x | x | 5 | 10 |
| CF₃ H / CH₃O / Cl / Cl / N=O / N-sec-C₄H₉ / O | ½ | 3 | 0 | 2 | 0 | 0 | 6 | 8 | K | x | x | x | x | 5 | 9 |
| | 1 | 5 | 0 | 4 | 0 | 2 | 9 | 9 | K | x | x | x | x | 5 | 10 |
| | 1½ | 5 | 0 | 2 | 0 | 3 | 9 | 10 | K | x | x | x | x | 8 | 10 |

Herbitoxicity Index—Field Rating

0 = No effect.
1 = 10%
2 = 20%
3 = 30%
4 = 40%  Alteration by visual observation based on reduction in stand,
5 = 50%  reduction in fresh weight of foliage, malformation and plant
6 = 60%  injury, for example chlorosis.
7 = 70%  A value of 3 or less is acceptable for crop selectivity.
8 = 80%
9 = 90%
10 = Complete kill.
x = Crop not injured.
I = Significant injury.
K = Crop killed.
AGW = Annual grass weeds.
ABW = Annual broadleaf weeds.

EXAMPLE 4

Selective post-emergence herbicidal activity

Selective post-emergence herbicidal activity is demonstrated in the following tests wherein 5 by 20 foot plots are prepared as described in Example 3 above. As indicated, they are sown with seeds of broadleaf weeds and grasses and then planted with soybeans, corn, wheat and sorghum in rows approximately 10 inches apart. When the corn has grown to approximately 16 inches, the soybeans to 3½ inches, the sorghum to 8 inches, the wheat to 5 inches and the weeds to 2½ to 3 inches in height, the planted plots are treated, at constant rates of application, with aqueous-acetone solutions of the test compounds containing 0.5% by vol. of a wetting agent, containing as the principal active ingredient dodecyl ether of polyethylene glycol. Eighteen days after application the plots are examined and rated for herbicidal efficacy. The rating index used is provided in Example 3 above and the data obtained are provided in Table IV below where it can be seen that effective control of broadleaf weeds and partial control of grasses is obtained at the ¼, ½ and 1.0 lb./acre rates. Little or no injury to corn is noted at any of these rates and only very slight detectable injury is noted on sorghum at such rates. Untreated control plots are heavily infested with all species of the broadleaf weeds and grasses used in these tests and identified in Example 3 above.

TABLE IV

| Compound | Rate, lb./acre | Corn 1 | Wheat 2 | Soybeans 3 | Corn 4 | Sorghum 5 | AGW | ABW |
|---|---|---|---|---|---|---|---|---|
| CF₃ H / CH₃O / Cl / Cl / N=O / N-i-C₃H₇ / O | ¼ | 0 | 3 | 10 | 1 | 1 | 6 | 10 |
| | ½ | 0 | 5 | 10 | 1 | 1 | 4 | 10 |
| | 1 | 1 | 10 | 10 | 1 | 4 | 8 | 10 |
| CF₃ H / C₂H₅O / Cl / Cl / N=O / N-i-C₃H₇ / O | ¼ | 0 | 2 | 6 | 0 | 1 | 5 | 00 |
| | ½ | 0 | 4 | 10 | 1 | 2 | 6 | 11 |
| | 1 | 0 | 9 | 10 | 1 | 1 | 6 | 10 |
| CF₃ H / CH₃O / Cl / Cl / N=O / N-sec-C₄H₉ / O | ¼ | 0 | 2 | 3 | 0 | 0 | 4 | 8 |
| | ½ | 1 | 3 | 8 | 1 | 1 | 5 | 9 |
| | 1 | 1 | 3 | 9 | 1 | 2 | 5 | 10 |

EXAMPLE 5

Preparation of 5,5-dibromo-6-hydroxy-3-isopropyl-6-(trifluoromethyl)hydrouracil

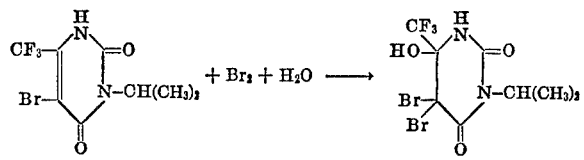

0.50 gms. of 5-bromo-3-isopropyl-6-(trifluoromethyl)-uracil is dissolved in 50 ml. of water and treated with bromine while stirring said mixture for 3 hours. A white solid forms in said mixture, is separated from said mixture and recrystallized from chloroform and petroleum ether to give the product which has a melting point of 167–168.5° C. and analyses as follows: $C_8H_9Br_2F_3N_2O_3$: Calculated: C, 24.14; H, 2.28; N, 7.04; Br, 40.16; F, 14.32. Found: C, 24.17; H, 2.33; N, 7.13; Br, 39.95; F, 14.62.

EXAMPLE 6

Preparation of 5,5-dichloro-6-hydoxy-3-isopropyl-6-(trifluoromethyl)hydrouracil

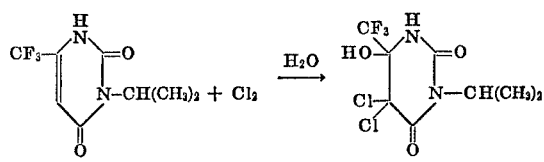

3-Isopropyl-6-(trifluoromethyl)uracil (4.0 g., 0.018 moles) is suspended in 50 ml. $H_2O$. $Cl_2$ is bubbled into this suspension for 5 hours while maintaining the temperature below about 50° C. After this time, TLC (2 x 8 Silica Gel plate, 1:5 HOAc-φH) shows one spot for the suspended solid, and it does not correspond to starting material. The solid is removed, and recrystallized from $CHCl_3$ to give white solid, m.p. 163–165° C.

EXAMPLE 7

Preparation of 5-chloro-5-methyl-6-hydroxy-3-isopropyl-6-(trifluoromethyl)hydrouracil

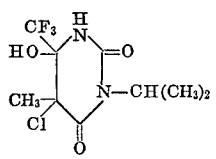

The above compound is prepared following substantially the procedure of Example 6 except that 3-isopropyl-6-(trifluoromethyl)uracil is replaced with 3-isopropyl-5-methyl-6-(trifluoromethyl)uracil.

EXAMPLE 8

Preparation of 5,5-dichloro-3-isopropyl-6-methoxy-6-(trifluoromethyl)hydrouracil

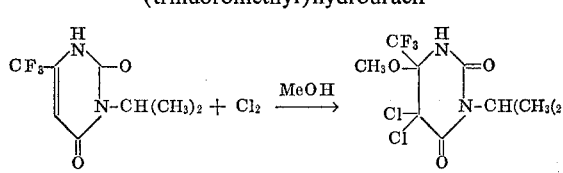

3-Isopropyl-6-(trifluoromethyl)uracil (4.0 g., 0.018 moles) is dissolved in 50 ml. absolute methanol. Chlorine is added to this solution and an exotherm occurs, however, the temperature of the reaction is maintained below about 60° C. Chlorine addition is terminated when the exotherm ceases and the methanol is then stripped. The resulting solid recrystallizes from 1:1 95% EtOH–$H_2O$ to give white product (4.85 g., 83.6% yield), m.p. 129–131° C. $C_8H_9Cl_2F_3N_2O$ calculated: C, 31.09; H, 2.93; Cl, 22.94; F, 18.44; N, 9.06. Found: C, 30.76; H, 2.95; Cl, 23.22; F, 18.70; N, 9.00.

EXAMPLE 9

Preparation of 5,5-dichloro-3-isopropyl-6-(1,3-dichloro-2-propoxy)-6-(trifluoromethyl)hydrouracil

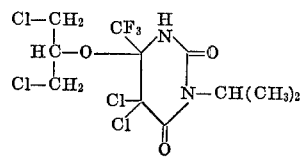

The above compound is prepared following the procedure of Example 8 except replacing methanol with 1,3-dichloro-2-propanol.

EXAMPLE 10

Preparation of 5,5-dichloro-3-(1,2-dichloroisopropyl)-6-methoxy-6-(trifluoromethyl)hydrouracil

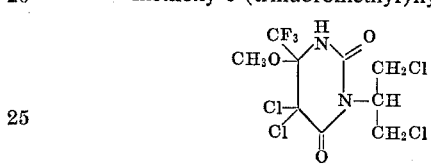

The above compound is prepared following the procedure of Example 8 except that 3-isopropyl-6-(trifluoromethyl)uracil is replaced by 3-(1,3-dichloroisopropyl)-6-(trifluoromethyl)uracil.

EXAMPLE 11

Preparation of 5,5-dichloro-3-(1,2-dihydroxyisopropyl)-6-methoxy-6-(trifluoromethyl)uracil

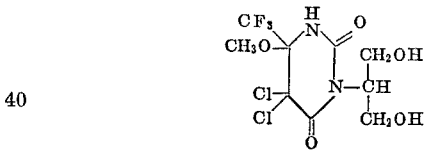

The above compound is prepared following the procedure of Example 8 except that 3-isopropyl-6-(trifluoromethyl)uracil is replaced by 3-(1,3-dihydroxyisopropyl)-6-(trifluoromethyl)uracil.

EXAMPLE 12

Preparation of 5,5-dichloro-3-allyl-6-methoxy-6-(trifluoromethyl)hydrouracil

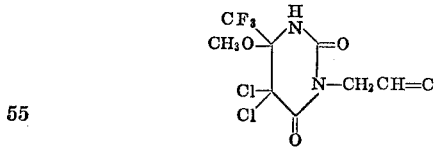

The above compound is prepared following the procedure of Example 8 except that 3-isopropyl-6-(trifluoromethyl)uracil is replaced by 3-allyl-6-(trifluoromethyl)uracil.

EXAMPLE 13

Preparation of 5,5-dichloro-3-n-hexyl-6-methoxy-6-(trifluoromethyl)hydrouracil

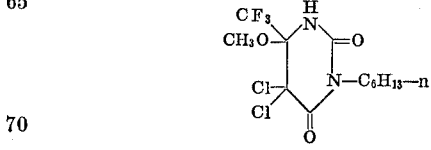

Following the procedure of Example 8, a solution of 0.0038 moles of 3-n-hexyl-6-(trifluoromethyl)uracil in 5 ml. of methyl alcohol is treated with chlorine gas. A slight exotherm insues but the reaction mixture is maintain below 30° C. The mixture is then poured into ice and a white precipitate forms having a melting point of 74–77° C. This product, 5,5 - dichloro-3-n-hexyl-6-methoxy-6-trifluoromethyl)-hydrouracil has the following analysis: $C_{12}H_{17}Cl_2F_3N_2O_3$: Calculated: C, 39.47; H, 4.69; F, 15.61; Cl, 19.42; N, 7.67; O, 13.14. Found: C, 39.55; H, 4.42; F, 15.83; Cl, 19.41; N, 7.76.

EXAMPLE 14

Preparation of 5,5-dichloro-3-cyclohexyl-6-methoxy-6-(trifluoromethyl)hydrouracil

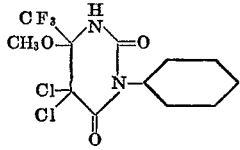

The above compound is prepared following the procedure of Example 13 except that 3-n-hexyl-6-(trifluoromethyl)uracil is replaced by 3 - cyclohexyl-6-(trifluoromethyl)uracil.

EXAMPLE 15

Preparation of 5,5-dichloro-6-ethoxy-3-isopropyl-6-(trifluoromethyl)hydrouracil

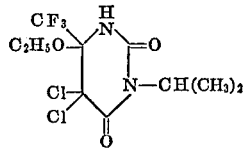

Using the procedure of Example 8, 0.0225 moles of 3-i-propyl-6-(trifluoromethyl)uracil is dissolved in 150 ml. of absolute ethanol and the mixture treated with chlorine gas. An exotherm results with the temperature of the reaction mixture increasing to 60° C., however, it is not permitted to exceed said temperature. The mixture is stirred, cooled and then poured into water yielding a white precipitate which is separated by filtration from the reaction mixture and has a melting point of 133–135° C. This product, 5,5 - dichloro-6-ethoxy-3-isopropyl-6-(trifluoromethyl)hydrouracil, is found to have the following analysis: $C_{10}H_{13}Cl_2F_3N_2O_3$: Calculated: C, 35.63; H, 3.89; Cl, 21.03; F, 16.91; N, 8.31; O, 14.24. Found: C, 35.46; H, 3.75; Cl, 21.16; F, 16.94; N, 8.31.

EXAMPLE 16

Preparation of 3-sec-butyl-5,5-dichloro-6-methoxy-6-(trifluoromethyl)hydrouracil

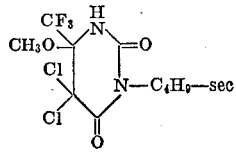

A solution of 0.085 moles of 3-sec-butyl-6-(trifluoromethyl)uracil in absolute methanol is treated with chlorine gas and stirred for 3 hours with the temperature of the reaction mixture maintained below 35° C. The mixture is then poured into 300 ml. of water and stirred. A white solid forms and is separated from the mixture. This product, 3 - sec-butyl-5,5-dichloro-6-methoxy-6-(trifluoromethyl)hydrouracil, has a melting point of 133–135° C.

EXAMPLE 17

Preparation of 5,5-dichloro-6-methoxy-3-phenyl-6-(trifluoromethyl)uracil

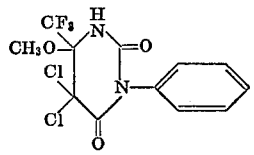

The above compound is prepared by the chlorination of 3-phenyl-6-(trifluoromethyl) following the procedure described in Example 16; m.p. 239–241° C.

EXAMPLE 18

Preparation of 5,5-dichloro-6-methoxy-3-methyl-6-(trifluoromethyl)hydrouracil

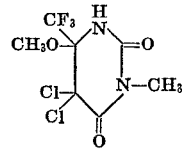

The above compound was prepared by the chlorination of 3-methyl-6-(trifluoromethyl)uracil in methanol following the procedure described in Example 16; m.p. 133–135° C.

EXAMPLE 19

Preparation of 5,5-dibromo-6-methoxy-3-phenyl-6-(trifluoromethyl)hydrouracil

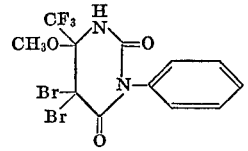

The above compound is prepared following the procedure of Example 17 except that 3-phenyl-6-(trifluoromethyl)uracil is brominated instead of chlorinated.

EXAMPLE 20

Preparation of 5,5-dibromo-6-methoxy-3-methyl-6-(trifluoromethyl)hydrouracil

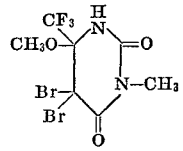

The above compound is prepared following the procedure of Example 18 except that 3-methyl-6-(trifluoromethyl)uracil is brominated instead of chlorinated.

EXAMPLES 21 TO 27

The compounds shown below are prepared in accordance with the procedures of Examples 17 and 19 by merely selecting the appropriately substituted 6-(trifluoromethyl)uracil reactant.

| Example number | Compound |
|---|---|
| 21 | ![structure with CF3, CH3O, Cl, Cl, N-phenyl-Cl] |
| 22 | ![structure with CF3, CH3O, Cl, Cl, N-phenyl-Br] |
| 23 | ![structure with CF3, CH3O, Br, Br, N-phenyl-NO2] |

TABLE—Continued

| Example number | Compound |
|---|---|
| 24 | ![structure with CF3, CH3O, Cl, Cl, N-phenyl-OC2H5] |
| 25 | ![structure with CF3, CH3O, Cl, Cl, N-phenyl(Br)(OCH3)] |
| 26 | ![structure with CF3, CH3O, Br, Br, N-phenyl-CF3] |
| 27 | ![structure with CF3, CH3O, Cl, Cl, N-phenyl(NO2)(Cl)] |

EXAMPLE 28

Preparation of 5,5-dichloro-3-isopropyl-6-propoxy-6-(trifluoromethyl)hydrouracil

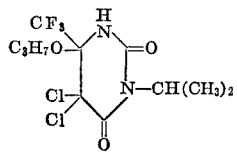

An excess of chlorine gas is bubbled into a solution of 0.009 moles of 3-isopropyl-6-trifluoromethyluracil in 15 ml. of n-propanol. The temperature of the reaction is maintained below 35° C. and when the exotherm ceases the mixture is poured into water. A white precipitate forms and is separated from the mixture. This product has a melting point of 81–82.5° C. and the following analysis: $C_{11}H_{15}Cl_2F_3N_2O_3$: Calculated: C, 37.62; H, 4.31; Cl, 20.19; F, 16.23; N, 7.98; O, 13.67. Found: C, 37.61; H, 4.15; Cl, 19.98; F, 16.49; N, 8.01.

EXAMPLE 29

Preparation of 5-bromo-5-chloro-3-isopropyl-6-methoxy-6-(trifluoromethyl)hydrouracil and 5-bromo-5-chloro-6-hydroxy-3-isopropyl - 6 - (trifluoromethyl)hydrouracil

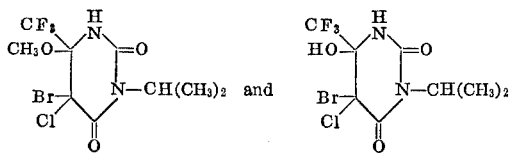

10.7 g. of ethyl 3-amino-4,4,4-trifluorocrotonate in 20 ml. of dimethyl sulfoxide (DMSO) is admixed with 8.5 g. of potassium t-butoxide in 50 ml. of DMSO while maintaining the reaction mixture at 25° C. 5.48 g. of Isopropylisocyanate is then added and the mixture stirred. The mixture is then poured into water and the resulting mixture extracted with ether. The aqueous phase is then acidified to pH 1 with HCl and extracted with ether. After water washing and drying the yellow solid, 3-isopropyl-6-(trifluoromethyl)uracil, is obtained. 7.4 g. of this product is then dissolved in 0.5 N NaOH (0.04 mole) and 15 ml. of chloroform. Chlorine is then bubbled into the mixture. After stirring for 1½ hours sodium bisulfite is added to discharge the color. The aqueous layer is then separated and extracted with chloroform. The chloroform extracts are washed with water and evaporated to dryness. The white solid, 3-isopropyl-5-chloro-6-(trifluoromethyl)uracil, is obtained. This product is then dissolved in methanol and treated with bromine while maintaining the reaction below about 31° C. After stirring the mixture is poured into water. A white solid forms which is collected by filtration and dried. This product, 5-bromo-5-chloro-3-isopropyl - 6 - methoxy-6-(trifluoromethyl)hydrouracil, has a melting point of 129—134° C. The filtrate from the above separation is then treated with chloroform and then pentane to give a white solid, m.p. 175–178° C. identified as 5-bromo-5-chloro-6-hydroxy-3-isopropyl-6-(trifluoromethyl)hydrouracil.

EXAMPLE 30

Preparation of 5,5,6-trichloro-3-isopropyl-6-(trifluoromethyl)hydrouracil

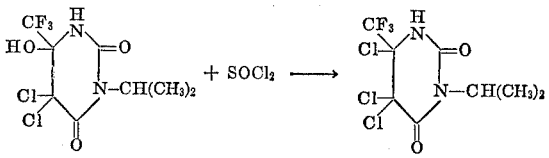

5,5-dichloro-3-isopropyl-6-hydroxy - 6 - (trifluoromethyl)hydrouracil (3.8 g., 0.012 moles) is completely dissolved in 25 ml. $SOCl_2$ and stirred 36 hours at room temperature. After this time the reaction solution is slowly and carefully poured into $H_2O$ with external cooling. The resulting crude white solid is recrystallized from ethyl acetate to give product, 1.2 g. (30.5% yield) m.p. 178–180° C.

EXAMPLE 31

Preparation of 5,5,6-tribromo-3-isopropyl-6-(trifluoromethyl)hydrouracil

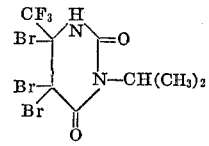

Following the procedure of Example 30, 5,5-dibromo-3-isopropyl-6-hydroxy - 6-(trifluoromethyl)hydrouracil is dissolved in thionylbromide ($SOBr_2$) and stirred at room temperature for 24 hours. The mixture is then poured into cold water which precipitates the product, 5,5,6-tribromo-3-isopropyl-6-(trifluoromethyl)hydrouracil.

EXAMPLE 32

Preparation of 5,5-dichloro-6-methoxy-6-(trifluoromethyl)hydrouracil

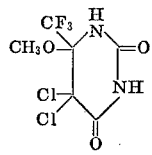

Chlorine was bubbled into a solution of 6-trifluoromethyluracil (5.0 g., 028 mole, CL72103) in 50 ml. absolute methanol with cooling to maintain a temperature of 30° C. or less. The addition of chlorine was stopped when the solid obtained by pouring an aliquot of the reaction solution into water showed no more unreacted starting material as shown by thin layer chromatography. The rest of the reaction solution was poured into water, stirred vigorously, and the resulting shiny white solid removed. After drying with reaction in the vacuum oven 6.43 g. (81.8%) produt was obtained with m.p. 206–208° C.

Analysis: Calculated for $C_6H_5Cl_2F_3N_2O_3$: C, 25.64; H, 1.79; Cl, 25.23; F, 20.28; N, 9.97. Found: C, 25.58; H, 1.72; Cl, 25.40; F, 20.32; N, 9.82.

EXAMPLE 33

Preparation of 5,5-dichloro-6-ethoxy-6-(trifluoromethyl) hydrouracil

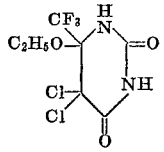

The above compound was prepared following substantially the same procedure as in Example 32 except that the methanol was replaced with ethanol; melting point was 169–171° C.

EXAMPLE 34

Preparation of 5,5-dichloro-6-propoxy-6-(trifluoromethyl)hydrouracil

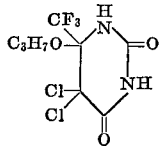

The above compound was prepared following substantially the same procedure as in Example 32 except that the methanol was replaced with n-propanol; melting point was 151–153° C.

EXAMPLE 35

Preparation of 5,5-dichloro-6-hydroxy-6-(trifluoromethyl)hydrouracil

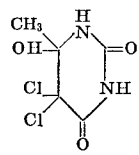

The above compound was prepared following substantially the same procedure as in Example 32 except that the methanol was replaced with water; melting point was 192–194° C.

EXAMPLE 36

Preparation of 5-methyl-5,6-dichloro-6-(trifluoromethyl)hydrouracil

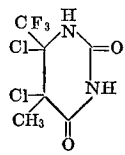

5 - Methyl-6-trifluoromethyluracil was prepared from ureas and ethyl 2-methyl-4,4,4-trifluoroacetoacetate in a manner similar to that reported by Kaiser and Burger in J. Org. Chem. 24, 113 (1959). This uracil is then converted to 5 - chloro-5-methyl-6-hydroxy-6-(trifluoromethyl) hydrouracil by procedure substantially similar to that given by Example 6. The resulting 6-hydroxyhydrouracil is then transformed to the corresponding 6-chlorohydrouracil by the procedure of Example 30.

EXAMPLE 37

Preparation of 5-chloro-5-methyl-6-hydroxy-6-(trifluoromethyl)hydrouracil

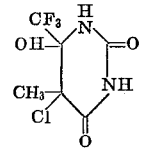

The above compound is prepared following substantially the same procedure as in Example 6 except that the 3 - isopropyl-6-(trifluoromethyl)uracil is replaced by 5-methyl-6-(trifluoromethyl)uracil.

We claim:

1. A method for the control of undesirable plant species comprising applying to a locus to be protected from said plant species a herbicidally effective amount of at least one compound represented by the formula:

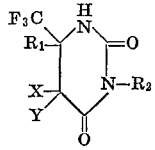

wherein X is selected from the group consisting of halogen and lower alkyl of $C_1$–$C_4$; Y is halogen; $R_1$ is selected from the group consisting of halogen, hydroxy, alkoxy of $C_1$–$C_6$, and mono- and di-haloalkoxy of $C_1$–$C_6$; and $R_2$ is selected from the group consisting of hydrogen; alkyl of $C_1$–$C_6$; alkenyl of $C_2$–$C_6$; mono- or di-substituted alkyl of $C_1$–$C_6$ having a substituent selected from the group consisting of halogen, hydroxy and lower alkoxy of $C_1$–$C_4$; phenyl; cyclohexyl; cyclopentyl; and mono- or di-substituted phenyl having a substituent selected from the group consisting of nitro, halogen, lower alkoxy of $C_1$–$C_4$, mono- or di-haloalkoxy of $C_1$–$C_6$ and trifluoromethyl, and the tautomers thereof and the water soluble sodium, potassium and ammonium salts of said compounds and tautomers, wherein said halogen and halo substituents are selected from the group consisting of fluorine, chlorine, bromine and iodine.

2. A method according to claim 1 wherein $R_1$ is selected from the group consisting of alkoxy, hydroxy, chlorine, fluorine and bromine.

3. A method according to claim 1 wherein the compound is selected from the group consisting of 5,5-dichloro-3-isopropyl-6-methoxy-6 - (trifluoromethyl)hydrouracil, 5,5-dichloro-6-ethoxy-3-isopropyl - 6 - (trifluoromethyl)hydrouracil, 3-sec-butyl-5,5-dichloro-6 - methoxy-6-(trifluoromethyl)hydrouracil, 5,5-dichloro-3-isopropyl-6-n-propoxy-6 - (trifluoromethyl)-hydrouracil and 5,5-dichloro-6-methoxy-6-(trifluoromethyl)-hydrouracil.

4. A method for the selective post-emergence control of undesirable plant species in the presence of growing crops comprising applying to the foliage of said undesirable plant species a herbicidally effective amount of at least one compound of claim 1.

5. A method according to claim 4 where $R_1$ is alkoxy.

6. A method according to claim 4 where $R_1$ is hydroxy.

7. A method for the selective pre-emergence control of undesirable plant species in the presence of crops comprising applying to soil containing seeds of undesirable plant species and crops a herbicidally effective amount of at least one compound of claim 1.

8. A method according to claim 7 where $R_1$ is alkoxy.

9. A method according to claim 7 where $R_1$ is hydroxy.

References Cited

UNITED STATES PATENTS 3,002,975 10/1961 Slezak _____ 71—92 X
3,235,363 2/1966 Luckenbaugh _____ 71—92

JAMES O. THOMAS, JR., Primary Examiner